United States Patent
Laufenberg et al.

(10) Patent No.: US 9,096,693 B2
(45) Date of Patent: Aug. 4, 2015

(54) METHOD FOR OBTAINING INULIN FROM PLANTS

(75) Inventors: Günther Laufenberg, Köln (DE); Friedrich Meuser, Berlin (DE)

(73) Assignee: BAYER CROPSCIENCE AG, Monheim (DE)

( * ) Notice: Subject to any disclaimer, the term of this patent is extended or adjusted under 35 U.S.C. 154(b) by 888 days.

(21) Appl. No.: 13/256,420

(22) PCT Filed: Mar. 11, 2010

(86) PCT No.: PCT/EP2010/001502
§ 371 (c)(1),
(2), (4) Date: Oct. 19, 2011

(87) PCT Pub. No.: WO2010/102806
PCT Pub. Date: Sep. 16, 2010

(65) Prior Publication Data
US 2012/0041188 A1    Feb. 16, 2012

Related U.S. Application Data

(60) Provisional application No. 61/159,913, filed on Mar. 13, 2009.

(30) Foreign Application Priority Data

Mar. 13, 2009  (EP) ..................................... 09155130

(51) Int. Cl.
*C08B 37/00* (2006.01)
*C07H 3/00* (2006.01)
(52) U.S. Cl.
CPC .................................. *C08B 37/0054* (2013.01)
(58) Field of Classification Search
CPC .. C07H 3/00; C08B 37/0054; A23V 2002/00; A23V 2250/00
USPC ....................................................... 536/123.1
See application file for complete search history.

(56) References Cited

U.S. PATENT DOCUMENTS

| | | | |
|---|---|---|---|
| 2,555,356 A | 6/1991 | Marchland | |
| 5,478,732 A | 12/1995 | Kunz et al. | |
| 2002/0098272 A1 | 7/2002 | Silver | |

FOREIGN PATENT DOCUMENTS

| | | |
|---|---|---|
| DE | 43 16 425 | 11/1994 |
| EP | 0 627 490 | 12/1994 |
| WO | WO 99/37686 | 7/1999 |
| WO | WO 2006/108697 | 10/2006 |
| WO | WO 2007/128559 | 11/2007 |

OTHER PUBLICATIONS

International Search Report for International Application No. PCT/EP2010/001502, mailed May 6, 2010.
Written Opinion for International Application No. PCT/EP2010/001502, mailed May 6, 2010.

*Primary Examiner* — Brandon Fetterolf
*Assistant Examiner* — Everett White
(74) *Attorney, Agent, or Firm* — Hunton & Williams LLP

(57) ABSTRACT

The invention describes a method for obtaining inulin which comprises: a) finely comminuting inulin-containing plant material, wherein particle sizes of the plant material are generated which are smaller than the size of the inulin-containing plant cells, b) suspending the finely comminuted plant material in a liquid, wherein inulin is released from the plant material and suspended in particulate form in the liquid, c) separating off plant particles from the liquid, wherein the inulin which is suspended in particulate form remains in the liquid, d) separating off the inulin which is suspended in particulate form from the liquid. The method is suitable in particular for obtaining inulin from artichoke roots.

28 Claims, 1 Drawing Sheet

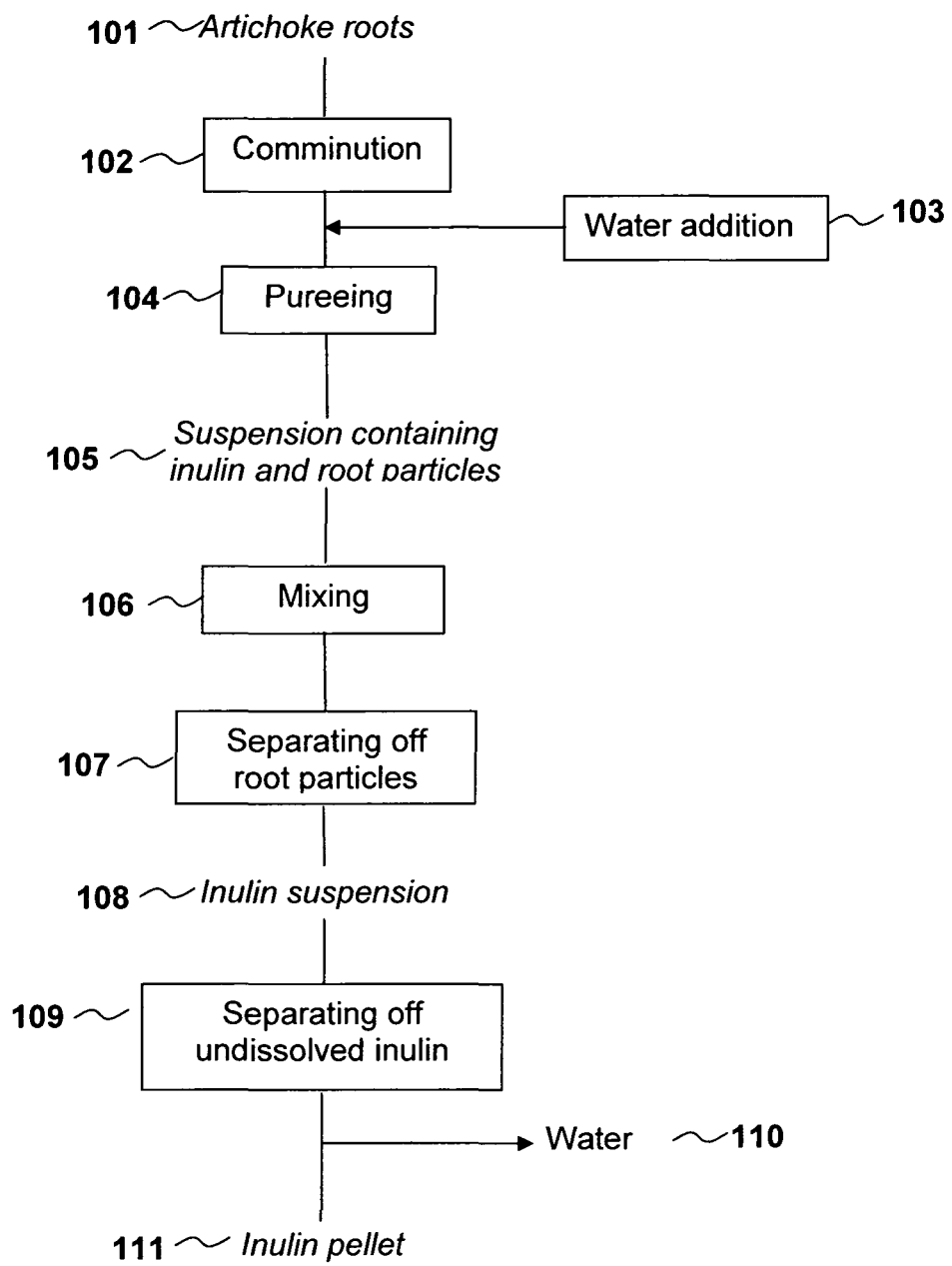

METHOD FOR OBTAINING INULIN FROM PLANTS

This application is a U.S. National Stage of International Application PCT/EP2010/001502, filed Mar. 11, 2010, which claims priority to EP 09155130.9, filed Mar. 13, 2009, and U.S. Provisional Patent Application 61/159,913, filed Mar. 13, 2009, the contents of each are hereby incorporated by reference in their entirety.

The present invention relates to a novel method for obtaining inulin from plants.

In recent decades, the demand for foods which contain less fat and more natural raw materials has greatly increased. As a substitute for fats, many substances have already been proposed such as products based on carbohydrates or protein, or synthetic fat substitutes such as fatty acid polyesters of sugars. However these always have disadvantages such as low heat stability, unsatisfactory "mouthfeel" or an unwanted effect on humans or the environment.

It has been known for a relatively long time that inulin is suitable for use in foods. Owing to the low available energy values for humans of inulin, the use of inulin as a fat substitute ensures a great decrease in the calorific value of the end product. Furthermore, inulin is used as a prebiotic additive and dietary fibre in foods.

Inulin is extracted from plants with warm or hot water in the prior art. The extraction is a separation method in which certain components are extracted from solid or liquid mixtures of matter using suitable solvents (extractants) (Römpp Lexikon der Chemie [Römpp's Lexicon of Chemistry], headword extraction, 10th edition, Thieme Verlag, 1997).

The extraction of inulin from chicory roots is the commercially most important method of obtaining inulin. Suitable techniques for isolating inulin from chicory roots comprise, e.g. comminuting chicory roots and extracting the inulin with hot water from the comminuted material. The most varied methods for producing inulin from plant sources, including extraction, purification and fractionation, have already been disclosed.

WO 1999037686 A1, DE 4316425, EP-A 627490 and US 2002098272 describe the extraction of inulin from chicory roots with hot water, i.e. water heated to and maintained at above 70° C., or boiling water.

WO 2007128559 describes a method for obtaining inulin in which artichoke roots are comminuted, by treatment of the comminuted roots with hot water an extract is obtained, inulin is precipitated out of the extract and the inulin is reprecipitated at least once.

U.S. Pat. No. 2,555,356 describes a method for obtaining inulin from Jerusalem artichoke in which the Jerusalem artichoke tubers are comminuted, an inulin-containing juice is pressed from the comminuted tubers and the juice is stored for 24 hours or longer at about 0° C. in order to crystallize out of the juice the inulin which is present therein in dissolved form.

The object of the present invention was, inter alia, to provide an alternative method for obtaining inulin from plants. This object is achieved by the method according to Claim 1. The subclaims relate to special embodiments of the method according to the invention.

The present invention relates to a method for obtaining inulin which comprises:
a) finely comminuting inulin-containing plant material, wherein particle sizes of the plant material are generated which are smaller than the size of the inulin-containing plant cells,
b) suspending the finely comminuted plant material in a liquid, wherein inulin is released from the plant material and suspended in particulate form in the liquid,
c) separating off plant particles from the liquid, wherein the inulin which is suspended in particulate form remains in the liquid,
d) separating off the inulin which is suspended in particulate form from the liquid.

The method according to the invention is distinguished from conventional extraction from the prior art in that the inulin which is obtained as product of the method is suspended in the liquid and not dissolved. The inulin which is obtained as product in the course of further process steps is isolated in particulate form from the plant. In the conventional extraction, which is described, e.g., in WO 1999037686 A1, DE 4316425, EP-A 627490 and US 2002098272, the inulin contained in the plant is extracted from the plant material quantitatively or virtually quantitatively using liquid extractant and the inulin is subsequently obtained back from the solution. In contrast to U.S. Pat. No. 2,555,356, inulin is not first crystallized out by cooling a previously pressed plant juice in which the inulin is present in dissolved form, but is already released from finely comminuted plant material in particulate undissolved form by adding a liquid.

The expression "inulin", in the context of the present invention, is taken to mean a polyfructan, the molecules of which consist of a beta-2-1-linked chain of fructose molecules. Preferably, but not obligatorily, this chain has a reducing alpha-D-glucose unit at the end thereof. Inulin according to the invention is a polydispersed mixture of molecules of differing chain length.

Plant material which is used in the method according to the invention can originate from all inulin-containing plants such as, e.g., from plants of the genus *Cynara*, such as artichoke (Globe artichoke, *Cynara scolymus*, recently also assigned to the species *Cynara cardunculus* L.), cardoons (*Cynara cardunculus* L.) chicory (*Cichorium intybus*), Jerusalem artichoke (*Helianthus tuberosus*), dahlia (*Dahlia*), or dandelion (*Taraxacum*).

The expression "plant material" comprises not only whole plants which contain inulin, but also inulin-containing parts of plants such as, e.g. roots, tubers, stems, blossoms, leaves. When plant material is mentioned hereinafter, inulin-containing plant material is meant thereby.

In one embodiment of the method according to the invention, the plant material consists of plant roots, preferably roots of artichokes (*Cynara cardunculus* or *Cynara scolymus*) or chicory (*Cichorium intybus*).

The expression "fine comminution" means that, at the end of the comminution process, the plant material attains particle sizes which are smaller than the size of the inulin-containing plant cell. This achieves a cell disruption and accessibility of the inulin which is stored in the plant cells. A guide value for the sought-after particle size is a particle size of 500 micrometers or less (≤500 micrometers), preferably 400 micrometers or less (≤400 micrometers), still more preferably 300 micrometers or less (≤300 micrometers), and most preferably up to 200 micrometers or less (≤200 micrometers), wherein this value can differ depending on the type of plant material used and should be matched in accordance with the size of the inulin-containing plant cells.

For the present method it is not necessary that the inulin-containing plant cells are disrupted quantitatively. That is, after the fine comminution, larger particles can perfectly well be present. However, attempts are made to make the proportion of disrupted plant cells as large as possible in order to achieve an inulin yield as high as possible.

Advantageously, the plant material, before the fine comminution, is freed from any adhering impurities, e.g. by intensive washing with water, wherein, in the case of artichoke roots, a high-pressure cleaner can also be used. In the case of roots, the washing can also proceed in the frozen state of the roots in order to keep the loss of mass of root material as low as possible.

The plant material can be comminuted in a plurality of stages, from coarse to fine, and by means of all devices which are familiar to those skilled in the art. Roots can first be coarsely precomminuted, e.g. by chopping.

For further comminution, preference is given to shredders, forage harvesters, dicers or granulators, wherein a Rotoplex 28/40 or RO20/12 (pilot plant scale) granulator from Hosokawa/Alpine is particularly proven. When artichoke roots (*Cynara Cardunculus, Cynara Scolymus*) are used as plant material, the product obtained is a comminuted root material in the form of usually fibrous pieces.

The concluding fine comminution can proceed by pureeing the plant material. The pureeing can proceed in conventional devices, wherein an Ultra Turrax or a Rietz disintegrator RA-12 from Hosokawa have proved to be particularly advantageous. The pureeing proceeds preferably with addition of liquid, such as e.g. water, wherein the amount of liquid is preferably set in such a manner that a free-flowing puree is obtained. The weight ratio of liquid to plant material is, for example, in the range 0.8/1-6/1.

If, during pureeing the plant material, liquid such as, e.g. water, is added, then the fine comminution and the suspension of the finely comminuted plant material in the liquid proceeds in one step. In principle, the fine comminution and the suspension can proceed successively by not adding the liquid or at least the majority of the liquid until after the fine comminution.

As already mentioned hereinbefore, the method according to the invention is distinguished from conventional extraction of the prior art in that the inulin which is obtained as product of the method, in the suspension of the finely comminuted plant material, is suspended in the liquid and not dissolved therein. The method is not restricted to certain yields. Therefore, also only a relatively small proportion of the inulin released from the plant may be suspended in the liquid and obtained as product after carrying out the further process steps.

The expression "suspending", in the present invention means that a suspension is produced which ultimately comprises finely comminuted plant material (plant particles), inulin released from the plant material, and a liquid. The expression "suspension" designates a heterogeneous mixture of matter of a liquid and undissolved solids finely distributed therein, wherein the solid in this case comprises finely comminuted plant material and inulin released from the plant material. The finely comminuted plant material can comprise plant cells which were not disrupted during the fine comminution and in which inulin which is not released is present. The inulin which is released from the plant material and suspended is present in particulate form. According to the invention, some of the inulin can pass into solution, in particular short-chain inulin. The inulin which is finally obtained as product of the method, however, is present in undissolved form in steps b), c) and d) of the method as suspended particles. The inulin particles can be crystalline.

The finely comminuted plant material (the plant particles) are intensively mixed with the liquid for releasing the inulin. The release of the inulin from the plant particles or from the disrupted plant cells can also be described as elution or washing out. For this, in the process step b) liquid is added to the finely comminuted plant material. For the mixing, e.g. an agitator, a dissolver or a wet mill can be used. The plant particles are slurried and held in suspension in the course of this. The inulin which is present in the plant cells is released from the plant cells during the suspension of the plant particles and passes into the liquid in which it is suspended.

For increasing the product yield, the method can be carried out in such a manner that the inulin which is released from the plant material is predominantly suspended in the liquid and is accessible as product of the method. The expression "predominantly suspended in the liquid" means that more than 50% by weight of the inulin released from the plant material is not dissolved in the liquid, but is suspended therein in particulate form. In advantageous embodiments of the method, a still greater proportion of the inulin released from the plant material is not dissolved in the liquid but only suspended therein. By this means the product yield of the method can be further increased. In such advantageous embodiments, at least 60% by weight, preferably at least 70% by weight, still more preferably at least 80% by weight, of the inulin released from the plant material remains in suspension.

For a given chain length profile of the plant inulin, via the choice of temperature and type of liquid, it is possible to control whether or to what extent inulin is dissolved or suspended in the liquid. The solubility of inulin molecules is firstly dependent on the temperature and the type of the liquid and secondly decreases with increasing chain length. The chain length of an inulin molecule is identical to its degree of polymerization and indicates from how many monosaccharide units the inulin molecule is built up. The chain length is hereinafter also abbreviated as "DP" (degree of polymerization).

In one embodiment of the method of the invention the liquid which is used for suspension is a polar liquid. The liquid is preferably an aqueous liquid. An aqueous liquid is herein defined as a liquid which predominantly consists of water or which solely consists of water. The term predominantly in this connection means a content of at least 50 percent by volume (vol-%).

In an advantageous embodiment of the method according to the invention, the liquid comprises water. A liquid comprising water has preferably a water content of ≥50 percent by volume (vol-%), more preferably ≥60 vol-%, still more preferably ≥70 vol-%, even more preferably ≥80 vol-%, and most preferably ≥90 vol-%. The liquid comprising water has in another embodiment a water content of 50 to <100 vol-%, more preferably 60 to <100 vol-%, still more preferably 70 to <100 vol-%, even more preferably 80 to <100 vol-%, and most preferably 90 to <100 vol-%.

A liquid component, which may be present in addition to water, is in one embodiment a liquid which is miscible with water. Thus, the liquid which is used for suspending the finely comminuted plant material is in this embodiment a liquid comprising water and another liquid (or liquid component, respectively) which is miscible with water. Such mixture preferably comprises water in the amounts (vol-%) as defined above.

A liquid component, which may be present in addition to water, is in another embodiment a polar liquid. Thus, the liquid which is used for suspending the finely comminuted plant material is in this embodiment is a liquid comprising water and another polar liquid (or liquid component, respectively). Such mixture preferably comprises water in the amounts (vol-%) as defined above.

Predominantly polar liquids or liquid mixtures are conceivable such as, e.g. a mixture of water and alcohol. As alcohol, ethanol and isopropanol are preferred. The higher the proportion of the alcohol chosen, the lower is the solubility of inulin. In a preferred embodiment, the liquid which is used for suspension is water, which means water without any other liquid added. It is, however, also possible to employ other pure polar liquids, as for example alcohols, such as ethanol and isopropanol.

In an advantageous embodiment of the method, the inulin suspended in the liquid consists essentially, i.e. at least 95% by weight, of inulin molecules having a chain length greater than 10. For this, the liquid and the temperature of the suspension are selected in such a manner that at least fructooligosaccharides (oligofructans) having a DP in the range of 3 to 10 and also mono- and disaccharides pass into solution during the suspending of the finely comminuted plant roots. If water is selected as liquid, then this aim can be achieved even at a temperature of about 20-30° C., preferably 20-25° C.

When the temperature of the suspension is increased, long-chain inulin molecules are also increasingly dissolved. Long chain inulin molecules are preferably defined as inulin molecules with a DP>10. By means of the selection of the temperature of the suspension, therefore, it is possible to determine what proportion of the long-chain inulin molecules are dissolved in the liquid or are not dissolved in the liquid but remain in suspension. The size of this proportion also depends on the properties of the liquid. For example, in the case of an alcohol/water mixture, the solubility of inulin can be lower than in the case of pure water at the same temperature. In addition, it must be noted that the solubility of the inulin decreases with increasing chain length. Therefore, when the temperature is increased, the molecular weight of the undissolved inulin is shifted toward higher values.

In a special embodiment of the invention, the plant material used is artichoke roots (*Cynara Cardunculus* L., *Cynara Scolymus*, Globe artichoke). In this embodiment it is possible to obtain an inulin having a particularly high weight average degree of polymerization DPw between 40 and 80, more preferably between 50 and 80. In this connection and in connection with the present invention, the term "between" is also intended to include the respectively indicated numerical limits. Very particularly preferably, an inulin can be obtained according to the present invention from artichoke roots which has the following characteristics: a DPw of 50-80 and a DPn of 41-66. The value for DPw (weight average degree of polymerization) and DPn (number average of the degree of polymerization) are determined using GPC-RI-MALLS. An exact description of this method is disclosed in the publication WO 2006/108697. The molecular weight of a monomer used in the conversions is 162 g/mol.

In a special embodiment of the method according to the invention, the suspension has a temperature of below 60° C., preferably of up to 50° C., more preferably of up to 40° C., still more preferably of up to 30° C. In this case the type of liquid is not restricted. Preferably, water is used. Other advantageous temperature ranges are at 5 to <60° C., 5 to 50° C., 5 to 40° C., 5 to 30° C., 5 to 25° C., 10 to <60° C., 10 to 50° C., 10 to 40° C., to 10 to 30° C., 10 to 25° C., 15 to <60° C., 15 to 50° C., 15 to 40° C., 15 to 30° C., 15 to 25° C., 20 to <60° C., 20 to 50° C., 20 to 40° C., and 20 to 30° C.

In a particularly advantageous embodiment of the method, the suspension has a temperature of 20-25° C., wherein all liquids mentioned hereinbefore can be used. In this embodiment, a liquid is used for suspending which has room temperature in the range of 18-25° C., preferably 20-25° C. Preferably, in this embodiment the liquid and the plant material, before mixing, each has a temperature in these ranges. In this embodiment a separate heat supply or cooling can be dispensed with. The advantage of these embodiments is that during suspending of the finely comminuted plant roots in the liquid, no external heat energy or cooling energy needs to be supplied, which makes the method particularly energy efficient. The mechanical energy introduced via the mixing of the suspension remains unconsidered in this case.

In a subsequent step of the method, called step c) hereinbefore, plant particles are separated off from the liquid, with the suspended inulin remaining in the liquid. The expression "plant particles" designates the product which is obtained after fine comminution of the plant material, that is to say therefore finely comminuted plant material. In this process step, the suspended inulin which is released from the plant material in the previously process step need not remain quantitatively in the liquid. Depending on the separation device and process conditions, some of the suspended inulin can be separated off together with the plant particles. The type of the plant particles depends on the plant material used. In the case of plant roots, they consist principally of fibres and woody particles.

The plant particles can be separated off by centrifuging, decanting, or using a mechanical separation device, for example a sieve or a Jet extractor. In the case of a sieve or a comparable separation device which separates according to particle size, the separation limit of the separation device is preferably selected in such a manner that as few as possible of inulin particles suspended in the liquid are separated off, but that the plant particles are separated off as quantitatively as possible. The particle size of the suspended inulin can be <100 micrometers, or else ≤50 micrometers, preferably ≤40 micrometers, more preferably ≤30 micrometers, still more preferably ≤25 micrometers, especially preferably ≤20 micrometers, and most preferably ≤10 micrometers. In the case of inulin from artichoke roots, the particle size of the suspended inulin can be up to approximately 10 micrometers.

In a special embodiment of the method according to the invention, step c) is carried out at a temperature of below 60° C., preferably of up to 50° C., more preferably of up to 40° C., still more preferably of up to 30° C. Further advantageous temperature ranges are 5 to <60° C., 5 to 50° C., 5 to 40° C., 5 to 30° C., 5 to 25° C., 10 to <60° C., 10 to 50° C., 10 to 40° C., 10 to 30° C., 10 to 25° C., 15 to <60° C., 15 to 50° C., 15 to 40° C., 15 to 30° C., 15 to 25° C., 20 to <60° C., 20 to 50° C., 20 to 40° C., and 20 to 30° C. It is understood in this case that in step c) the suspension has a temperature in the ranges mentioned hereinbefore.

Step c), in an advantageous variant of the invention, is carried out at the same temperature as process step b).

In a further embodiment, the step c) is carried out at a temperature in the range of 18-25° C., preferably 20-25° C. and without external heat supply. This is taken to mean that in step c) the suspension has a temperature in said ranges.

For increasing the yield of the method, the plant particles, after they are separated off from the liquid, can be again comminuted and the process steps a)-c) repeated.

After step c) and before step d) an intermediate step can be included, wherein precipitated inulin, if any, is suspended in the liquid again.

In the last step d), the suspended inulin is separated off from the liquid, for obtaining the product of the method, wherein the separation need not be quantitative. The separation can be performed, e.g., by means of a centrifuge or hydrocyclones. In addition, devices such as sieves and filters can also be used, and also all other separation devices known to those skilled in the art for separating off particles in the micrometer range from liquids.

In an advantageous embodiment, the step d) is carried out at the same temperature as the steps b) and c). Corresponding temperature ranges are mentioned further hereinbefore in the description of the steps b) and c). This can prevent, in this step, low-molecular-weight saccharides and low-molecular-weight inulin fractions which were previously brought into solution, from precipitating out again from the solution and being fed to the product. Lowering the temperature in step d) could lead to such result. This is unwanted, in particular, when the product which is desired to obtain is an inulin having a high medium molar mass. This embodiment is of importance, in particular, when the process steps b) and c) are carried out at temperatures above 18-25° C. or 20-25° C.

In a further advantageous embodiment, step d) also is carried out at 18-25° C., preferably 20-25° C.

The inulin which is obtained can be dried by all methods known to those skilled in the art such as, e.g., air-lift drying, spray drying, vacuum drying and freeze drying, and also roller drying.

In the said methods, further steps can be present in addition to the described steps a)-d). Those which may be mentioned are, e.g., the described cleaning of the plant material before carrying out step a), or further purification and/or drying steps which follow the step d), or further steps between the steps a)-d).

In one embodiment of the method, the steps a) and b) described hereinbefore directly follow one another without any intermediate step. In one further embodiment of the method, the steps b) and c) described hereinbefore immediately follow one another, without any intermediate step. In a still further embodiment of the method, the steps c) and d) described hereinbefore immediately follow one another without any intermediate step. These embodiments can be combined in any combination. In a special embodiment, in the case of the process steps a), b), c) and d), no sort of intermediate step is provided, and so all described steps a), b), c) and d) directly follow one another. In this embodiment, however, further steps can be provided upstream of the step a) and downstream of the step d). Those which may be mentioned are, e.g., the described cleaning of the plant material before carrying out step a), or further purification and/or drying steps which follow step d).

In one embodiment of the method, the inulin which is separated off in step d), hereinafter also termed product of the method, can be purified in one or more further steps, if a purification appears to be necessary. After the product of the method is separated off from the liquid, impurities can still be present such as, e.g., very fine plant particles, sludges and colouring substances. The product of the method can be purified, for example, by recrystallization, (ultra)filtration, dissolution and precipitation with a solvent, e.g. with ethanol or isopropanol, or chromatography.

In the case of a filtration, the product of the method can be dissolved completely in a solvent with supply of heat and subsequently the solution can be filtered, in order to separate off very fine solid particles. In addition, a purification can also proceed, by treating a solution of the product of the method with activated carbon.

Using the abovementioned techniques it is possible, in addition to a purification, also to carry out a fractionation of the product of the method for achieving a greater medium chain length of the product, as described in patent application EP-A-0627490.

The purified inulin can be dried using all methods known to those skilled in the art, such as, e.g., air-lift drying, spray drying, vacuum drying and freeze drying, and also roller drying.

The invention will be described hereinafter in special embodiments and using examples which should not be interpreted as a restriction of the general inventive concept.

DRAWINGS

FIG. 1 shows a flow chart of a special embodiment of the method in which artichoke roots are used as inulin-containing plant material.

Artichoke roots (from *Cynara Cardunculus/Cynara Scolymus*) 101 are first comminuted 102, wherein here coarse comminution is performed. For comminution 102, for example a granulator 28/40 from Hosokawa/Alpine, a dicer from Urschel or a comparable device can be used. Water is then added to the root pieces 103. The mass ratio of water/root can be set, for example, to 1/1-6/1.

The mixture of comminuted artichoke roots and water is pureed 104. For the pureeing 104, for example a Rietz disintegrator RA-12 or RP6 (pilot plant scale) from Hosokawa or an Industrieturrax, from Stephan, can be used, for example. A suspension containing inulin and very fine root particles 105 is obtained which are subsequently intensely mixed 106, e.g. by stirring, in order to release as much inulin as possible from the root cells. In this case some of the inulin, in particular shorter-chain fractions, can be dissolved in the water. To what extent this occurs depends on the water temperature and on the temperature at which the process steps 104 and 106 are carried out.

In the next step the fine root particles are separated off 107. This can be achieved, e.g., by allowing the suspension to stand, allowing the fine root particles to settle and subsequently decanting them. In the decanting process inulin particles form a dense precipitate on top of which fine root particles form a phase which can be decanted. Alternatively, the suspension can also be centrifuged under suitable conditions or sieved through a suitable sieving device, in order to separate off the root particles. The conditions are selected such that in the step 107 the inulin for the most part remains undissolved in the water phase or as a precipitate and is not separated off in conjunction. As intermediate, an inulin suspension 108 is obtained. If root particles are separated off by decanting or centrifugation, precipitated inulin can be suspended again in the water phase in order to obtain an inulin suspension. If root particles are separated off by sieving, this is not necessary.

Finally, the undissolved inulin is separated off 109 from the suspension. This is achieved, e.g., using a centrifuge having a sufficiently high gravitational field which permits the fine inulin particles to be separated off. As by-product, water 110 is obtained which can contain a proportion of low-molecular-weight inulin in dissolved form and also other soluble components from the artichoke root. The product of the method is obtained as an inulin pellet 111.

The inulin pellet 111 can be dried and/or subjected to further purification steps if this appears to be necessary.

EXAMPLES

Example 1

Carrying out an Isolation of Inulin from Artichoke Roots (*Cynara Scolymus*) at Room Temperature 1.1 Comminution/Granulation Machine Frozen artichoke roots (*Cynara scolymus/Cynara cardunculus* L.) were processed. The roots were allowed to stand overnight at room temperature and processed on the next day. Straight roots having as few as possible side shoots were used. Thin root side shoots were removed with a kitchen knife. Use was made of 720 g of artichoke roots. These were processed to 2 mm-thick slices using a sausage slicing machine. The initial pieces were subject to squashing and remained sticking in the cutting channel. The machine was switched off occasionally and the cutting channel cleaned. The end pieces were not cut into pieces under 3 cm. The yield of the cut slices was 522 g. The difference of 198 g corresponded to soil, foreign matter and artichoke root end pieces.

1.2 Handpicking/Peeling/Dicing

The cut artichoke slices were collected by handpicking. It was observed during this that the pith could be very readily separated from the peel by pressing. The time for peeling was 16 min. The yield of artichoke core material was 336 g and the yield of artichoke peel or foreign matter was 181 g. The artichoke slices were successively processed using a domestic Genius machine to artichoke dice having a size of 4 mm×4 mm. Production time 11 min.

1.3 Comminution Using the Waring Blender and Ultra Turrax

The 336 g of artichoke dice were charged with 336 g of water into the Waring blender (400 watt appliance without speed display) and then precomminuted.

| | |
|---|---|
| 1 minute | Step 1 |
| 2 minutes | Step 2 |
| 2 minutes | Step 3 (max) |

By means of the size of the dice, the precomminution proved to be problem-free and can optionally be omitted.

The comminuted artichoke dice mass was decanted into a 5 liter glass beaker and 500 ml of water were poured on. This mass was comminuted using the Ultra Turrax (1 min at step 3, corresponding to 6400 rpm). The time was deliberately selected to be short, since the particle size should not be too small. In the subsequent sieving through 90 μm and 63 μm it was observed that the fibrous solid appeared to be swollen and the particle size was large. The liquid obtained was designated number 1 and reserved. Then one aliquot of the sieved solids was taken off (64 g of solids, which had been frozen and freeze dried). The remaining solids were admixed with 1.4 liters of water and comminuted using the Ultra Turrax at step 2 (5200 rpm) for 5 minutes. Then the mixture was again decanted through the abovementioned sieve. The liquid obtained was designated number 2. Then one aliquot of the sieved solids was taken off (30 g of solids frozen and freeze dried). The remaining residue was admixed with 2 liters of water and comminuted for 2 min at the maximum (10 000 rpm) using the Ultra Turrax. The liquid obtained was designated number 3.

The peel with foreign matter was processed at a later time point. 181 g of artichoke peel with foreign matter were comminuted with 470 g of water in the Waring blender for 5 min, then decanted into a glass beaker and admixed with 1.6 liters of water. Then the Ultra Turrax was used at 10 000 rpm for 5 minutes. The comminution product was, as already described, sieved, and the liquid obtained was designated 4. The solids were frozen and freeze dried.

1.4 Centrifugation

Each centrifugation was performed at 4000 rpm for 10 min. The liquids 1-4 obtained were successively processed without mixing them according to the following procedure: the liquid obtained, after sieving, was transferred into a 750 ml container and centrifuged. After decanting, the precipitates were combined and diluted with water to a maximum in order to achieve purification. The mixture was then transferred to 50 ml Falcon tubes and then the slime layers were separated.

For further analytical purposes, all liquids obtained for each working passage were collected and concentrated using a rotary evaporator. The remaining liquids were deep frozen and dried using the freeze-drying unit.

Example 2

Production of Inulin Suspensions for Determining the Solubility of Inulin at Differing Temperatures The starting material used was artichoke root inulin which was obtained according to Example 1.

In each case about 20 mg of inulin were suspended in water at various temperatures (20; 30; 40; 50; 60° C.). Batch: a 1% solution (water at room temperature (RT)) was suspended for 20 min at 300 rpm at the various temperatures in Eppendorf tubes (repeated inverting).

Thereafter the suspensions were centrifuged for 5 min at 13 000 rpm in order to separate off the undissolved inulin. The supernatant containing dissolved inulin was taken off and transferred into another Eppendorf tube. The pellet and its supernatant were freeze dried (48 h).

Analysis: the inulin obtained from the pellet and the supernatant was analyzed by gel-permeation chromatography (GPC-RI). The empty weights of all Eppendorf tubes used were recorded. For preparation of the GPC-RI analysis, on the basis of the masses determined of the freeze-dried residues, a 1% solution was produced. The batches were dissolved for 20 min at 95° C. and 300 rpm (repeated inverting). After the dissolution operation, the 1% solutions were diluted 1:10 with DMSO and centrifuged with 0.22 μm filter inserts for 5 min at 8000 rpm.

For determining the inulin masses in the supernatant and in the pellet, a calibration curve was prepared using the standards Raftiline HP® and an artichoke inulin having a DPw=69. With the aid of the calibration curve, the peaks in the GPC diagram could be assigned to an absolute mass.

TABLE 1

Results:

| Sample number | Type of sample | Temperature [° C.] | Inulin in pellet or supernatant [%] | MW GPC main peak [g/mol] | DPw [1) |
|---|---|---|---|---|---|
| 1.1 | Pellet | 20 | 68.3 | 9055.5 | 56 |
| 1.2 | Pellet | 20 | 67.9 | 9190.4 | 57 |
| 2.1 | Pellet | 30 | 64.6 | 9248.7 | 57 |
| 2.2 | Pellet | 30 | 63.1 | 9326.6 | 58 |
| 3.1 | Pellet | 40 | 49.5 | 9962.1 | 61 |
| 3.2 | Pellet | 40 | 51.4 | 9829.2 | 61 |
| 4.1 | Pellet | 50 | 31.2 | 10505.1 | 65 |
| 4.2 | Pellet | 50 | 30.3 | 10720.2 | 66 |
| 5.1 | Pellet | 60 | 11.9 | 10995.3 | 68 |
| 5.2 | Pellet | 60 | 13.3 | 10885.7 | 67 |
| 7.1 | Supernatant | 20 | 31.7 | 5114.2 | 32 |
| 7.2 | Supernatant | 20 | 32.1 | 5110.8 | 32 |
| 8.1 | Supernatant | 30 | 35.4 | 5252.2 | 32 |
| 8.2 | Supernatant | 30 | 36.9 | 5344.8 | 33 |
| 9.1 | Supernatant | 40 | 50.5 | 5799.6 | 36 |
| 9.2 | Supernatant | 40 | 48.6 | 5750.5 | 35 |
| 10.1 | Supernatant | 50 | 68.8 | 6633.0 | 41 |
| 10.2 | Supernatant | 50 | 69.7 | 6591.5 | 41 |

TABLE 1-continued

Results:

| Sample number | Type of sample | Temperature [°C.] | Inulin in pellet or supernatant [%] | MW GPC main peak [g/mol] | DPw [1] |
|---|---|---|---|---|---|
| 11.1 | Supernatant | 60 | 88.1 | 7389.0 | 46 |
| 11.2 | Supernatant | 60 | 86.7 | 7317.9 | 45 |

[1] Monomer unit: 162 g/mol

The experiment does not represent the complete method according to the invention. It is a model experiment in order to obtain approximate evidence of the product yield of the method according to the invention and the chain length profile of the product of the method. For this artichoke inulin (*Cynara scolymus*) was suspended at various temperatures. The product of the method is the suspended, undissolved inulin, here embodied by the inulin in the pellet.

It can be seen from the table that, with increase in temperature, more inulin as a percentage passes into solution and less inulin remains suspended. At 95° C. virtually all inulin is dissolved. Therefore, the yield of the method according to the invention falls with an increase in temperature.

Furthermore, it can be seen that the medium molar masses of the inulin in the pellet and of the dissolved inulin increase with increasing temperature. Firstly, with the temperature increase, more and more relatively long-chain inulin passes into solution, whereby the medium molar mass of the dissolved inulin increases. Secondly, at temperature elevation, only very high-molecular inulin fractions remain undissolved, whereby the medium molar mass of the undissolved inulin also increases. If it is desired to obtain, as product of the method, a product having a molar mass as high as possible, then an elevated temperature will be employed. At a temperature of 60° C., in the model experiment, a DPw of the product of 67-68 is achieved, and at a temperature of 20° C., a DPw of 56-57 is achieved. However, at the same time, in the model experiment the yield falls from approximately 68% (20° C.) to approximately 12-13% (60° C.).

The model experiment shows that in the method according to the invention, at a temperature of 20° C., i.e. without further heat supply, a relatively long-chain inulin (DPw 56-57) is to be expected from artichoke roots in a relatively high yield (68%).

Example 3

3.1 Material

Artichokes (*Cynara Scolymus*) of variety Gobbo di Nizza were used, amount 50 kg, dried in sun, stored loose.

3.2 Preparation of the Material

Roots were unpacked and laid out loose in the greenhouse.
20 kg of roots were cleaned using a high-pressure cleaner and laid out again for drying.
Start of the experiment:
cut into pieces (approximately 4)
grated in Agrobloc with the coarsest insert
grated matter packaged air-tightly in plastic and stored cold overnight.
15 kg of grated matter were processed using the Industrieturrax (1.4 mm hole width) and charged into a large vessel (50 l).
Masses: 15 kg of grated matter, 30 kg of water resulted in 45 kg of Turrax-comminuted material, subsequently termed finely comminuted material.

3.3 Small Experiment 1

Finely comminuted material: 502 g
Water: 1000 ml
stir, sieve, press, discard presscake
Liquid 1112 g
Centrifuge at 4000 rpm, 10 min
The supernatant was passed through a 20 μm sieve: no fibres were visible on the sieve.
Pellet 36 g, from 502 g of finely comminuted material ~10%. Approximately 5 g~1% of inulin were expected.
The pellet was taken up with 193 ml of water, and a further 124 g of water were added thereto.
The total mass 353 g was passed through a 20 μm sieve which rapidly plugged. Approximately 10 ml passed through. In the microscope at 10×100 times, crystals were to be seen (filtrate 1).
The remaining 340 g were placed in a centrifuge at 4000 rpm, which yielded 27 g of pellet. 10 g thereof were transferred to a Falcon tube.
10 g of pellet were dissolved in the microwave at above 88° C. Fibres could clearly be seen.
The total residual pellet 17 g was heated to >88° C. and again passed through a 20 μm sieve which became immediately plugged. Minimal filtrate 2.
Filtrate 2 (hot, 1-3)
Filtrate 3 (residue on sieve, liquid phase)
Sieve residue 4 (residue on sieve, solid phase)

3.4 Large Experiment 1

Finely comminuted material 10 kg
Water 32 l
stir, sieve, 125 μm, hand press
yielded 33.5 l of liquid, 8.022 kg of presscake
centrifuge, 12 000 G, 7000 rpm, 10 min, in plurality of batches
pellets were combined, water content determined via Karl Fischer. Karl Fischer value: 75.75% water content
Samples:
1 Finely comminuted material, untreated, diluted 1:2, comminuted in the Turrax
2 Sieve residue, presscake after sieving
3 Supernatant after the first centrifugation
4 Pellet 1
5 Pellet 2, supernatant
6 Pellet 2, bottom layer
Two phases of pellet 2 were obtained.
Samples 1-6 for analysis
Samples 4-6 for dry matter determination
Samples 4-6 for examination by light microscopy
Masses:
Total pellet after first centrifugation (sample 4) 806 g
Supernatant after first centrifugation (sample 3) 33 l 3.5 Supplementary Experiment 1

Sample pellet 1600 g
Water 1200 g
centrifuge, 12 000 G, 7000 rpm, 10 min
Two phases are clearly recognizable and two samples were taken.

Sample 5 supernatant, slimy
Sample 6 bottom layer, very solid
Masses:
Pellet 2, supernatant, 306 g
Pellet 2, bottom layer 287 g

3.6 Supplementary Experiment 2

Pellet 2, supernatant, sample 5
Pellet 2, bottom layer, sample 6
Observation:
In sample 6, a precipitate was immediately deposited, in sample 5 a slight precipitate on addition of ethanol.
10 ml of alcohol and 5 ml of sample were centrifuged.
This yielded 500 g of sieve residue 2 which was washed with water.
Samples:
7 presscake, washed
8 presscake liquid

3.7 Analysis of the Sample Material

Starting materials were freeze-dried samples.
The sample preparation and isolation were carried out on the scale of an Eppendorff tube.

Starting material of this inulin isolation was an artichoke root puree (<1.4 mm). The samples PR 1-PR 8 were taken during the preparation process and frozen at −80° C. for preparation for the freeze drying. After the freeze drying, the sample material was ground and prepared for analysis as noted below. The samples PR 1, PR 2 and PR 7 were homogenized in the Retsch GM 200 knife mill (2×10 sec, at 10 000 rpm).

Samples PR 1, PR 2 and PR 7 were treated as detailed
weigh out 100 mg of the powder into a 2 ml Eppendorff tube
carefully admix with 1 ml of water and gently invert
incubate 1 h at 95° C. and 300 rpm
then centrifuge the Eppendorff tube (5 min, 13 000 rpm)
take off the supernatant and transfer it to a new Eppendorff tube, also store at 95° C.
again admix the pellet with 1 ml of water
again treatment for 1 h at 95° C. and 300 rpm
again centrifuge the liquid (5 min, 13 000 rpm)
pipette supernatant 2 to supernatant 1

Samples PR 3-PR 6 and PR 8 were dissolved in 2 ml of DMSO for 20 min at 300 rpm and 95° C. in the shaking heating block. The samples were diluted for the GPC-RI analysis 1:2 or 1:4 with DMSO. The weights and dilutions can be seen in the Fructan content table.

TABLE 2

Analytical data, calculated on the basis of the GPC-RI analyses

| Sample Lab. Code | Sample description | DPw Total profile | GPC-RI data DPw VLCI | MW [% > 900 g/mol] | Dry matter % [absolute] | Residual water % [Powder] - KFT | Conc. VLCI [% powder weight] | [% DM powder] |
|---|---|---|---|---|---|---|---|---|
| PR 1 | Root mass 1 part + 2 parts water | 36 | 46 | 81.3 | 20.1 | 8.28 | 43.4 | 47.4 |
| PR 2 | Sieve residue__root presscake | 44 | 48 | 93.5 | 18.1 | 9.88 | 44.7 | 49.6 |
| PR 3 | Supernatant after centrifugation | 11 | 28 | 36.1 | 1.6 | 13.87 | 23.6 | 27.4 |
| PR 4 | Pellet 1 | 52 | 54 | 97.4 | 21.0 | 8.54 | 69.3 | 75.8 |
| PR 5 | Pellet 2__supernatant | 53 | 55 | 98.3 | 10.4 | 9.53 | 72.5 | 80.1 |
| PR 6 | Pellet 2__bottom layer | 52 | 53 | 98.5 | 32.7 | 6.93 | 74.0 | 79.5 |
| PR 7 | Presscake, water-treated | 45 | 49 | 94.2 | 12.1 | 9.39 | 43.5 | 48.0 |
| PR 8 | Wash water__presscake liquid | 23 | 42 | 56.4 | 0.2 | 13.19 | 30.2 | 34.7 |
| Fructan 12 | Internal standard | n.d. | 26 | n.d. | 94.4 | 2.8 | 107.9 | 111.0 |
| Fructan 20 | Internal standard | n.d. | 70 | n.d. | 90.8 | 4.2 | 109.6 | 114.5 |

TABLE 3

Calculation of mass balances

| Sample Lab. Code | Sample description | Samples masses Process [g] | Dry matter % [absolute] | Dry matter g [absolute] | Conc. - VLCI [% DM powder] | Mass of VLCI g [absolute] | Proportion of Inulin (% of initial amount) |
|---|---|---|---|---|---|---|---|
| Sample 1 | Root mass 1 part + 2 parts water | 10000 | 20.1 | 2010.1 | 47.4 | 952 | 100 |
| Sample 2 | Sieve residue__root presscake | 8022 | 18.1 | 1452.5 | 49.6 | 720 | 76 |
| Sample 3 | Supernatant after centrifugation | 33000 | 1.6 | 534.0 | 27.4 | 146 | 15 |
| Sample 4 | Pellet 1 | 806 | 21.0 | 169.3 | 75.8 | 128 | 13 |
| Sample 5 | Pellet 2__supernatant | 306 | 10.4 | 31.7 | 80.1 | 25 | 3 |
| Sample 6 | Pellet 2__bottom layer | 287 | 32.7 | 93.7 | 79.5 | 74 | 8 |
| Sample 7 | Presscake, water-treated | 8022 | 12.1 | 969.9 | 48.0 | 465 | 49 |
| Sample 8 | Wash water__presscake liquid | 80000 | 0.2 | 155.0 | 34.7 | 54 | 6 |

The invention claimed is:

1. A method for obtaining inulin comprising:
   a) finely comminuting inulin-containing plant material, wherein the comminuting produces plant particles that are smaller in size than inulin-containing plant cells,
   b) suspending the finely comminuted plant particles in a liquid thereby forming a suspension, and releasing inulin from the plant particles, in particulate form into the liquid,
   c) separating plant particles from the liquid, wherein the inulin which is suspended in particulate form remains in the liquid, which is carried out at a temperature of 5° C. to <60° C., and
   d) separating off the inulin which is suspended in particulate form from the liquid.

2. The method according to claim 1, further comprising purifying the inulin from d).

3. The method according to claim 2, wherein the purification is done using recrystallization, (ultra)filtration, dissolution and precipitation with a solvent, or chromatography.

4. The method according to claim 2, wherein the fine comminution is achieved by pureeing, and wherein the liquid of step (b) is water.

5. The method according to claim 4, wherein the plant material is artichoke roots (*Cynara scolymus* or *Cynara cardunculus* L.) or chicory roots (*Cichorium intybus*).

6. The method according to claim 2, wherein steps b) and c) are carried out at the same temperature.

7. The method according to claim 1, wherein the liquid of step b) is water.

8. The method according to claim 1, wherein the suspension of step b) has a temperature of 5° C. to <60° C.

9. The method according to claim 8, wherein step c) is carried out at a temperature of 5° C. to <60° C., and wherein step d) is carried out at a temperature of 5° C. to <60° C.

10. The method according to claim 1, wherein the plant material is plant roots, tubers, stems, blossoms, or leaves.

11. The method according to claim 10, wherein the plant roots are artichoke roots (*Cynara scolymus* or *Cynara cardunculus* L.) or chicory roots (*Cichorium intybus*).

12. The method according to claim 11, wherein the plant roots are artichoke roots, and further comprising obtaining inulin from said roots having a weight average degree of polymerization of 40 to 80 DPw, as determined by GPC-RI-MALLS.

13. The method according to claim 11, wherein the plant roots are artichoke roots, and further comprising obtaining inulin from said roots having a weight average degree of polymerization of 50 to 80 DPw, as determined by GPC-RI-MALLS.

14. The method according to claim 13, wherein the inulin has a number average degree of polymerization of 41 to 66.

15. The method according to claim 11, wherein the plant roots are artichoke roots, and further comprising obtaining inulin from said roots having a number average degree of polymerization of 41 to 66.

16. The method according to claim 1, comprising separating the plant particles of step c) from the liquid by a decanter or a sieve.

17. The method according to claim 1, comprising separating the suspended particulate form inulin molecules from the liquid by centrifugation.

18. The method according to claim 1, wherein the fine comminution is achieved by pureeing the plant material.

19. The method according to claim 1, wherein the inulin obtained in step d) has a chain length (DP) greater than 10.

20. The method according to claim 1, wherein the plant particles produced by fine comminuting have disrupted plant cells.

21. The method according to claim 1, wherein the liquid of step b) is water, and wherein the plant material is artichoke roots (*Cynara scolymus* or *Cynara cardunculus* L.) or chicory roots (*Cichorium intybus*).

22. The method according to claim 1, wherein steps b) and c) are carried out at the same temperature.

23. The method according to claim 1, wherein steps b), c), and d) are carried out at the same temperature.

24. The method according to claim 1, wherein the inulin obtained has a weight average degree of polymerization (DPw) between 40 and 80, as determined by GPC-RI-MALLS.

25. The method according to claim 1, wherein the inulin obtained has a weight average degree of polymerization (DPw) between 50 and 80, as determined by GPC-RI-MALLS.

26. The method according to claim 1, wherein the suspension of step b) has a temperature of 15 to 30° C., wherein step c) is carried out at a temperature of 15 to 30° C., and wherein step d) is carried out at a temperature of 15 to 30° C.

27. The method according to claim 1, wherein the suspension of step b) has a temperature of 20 to 30° C., wherein step c) is carried out at a temperature of 20 to 30° C., and wherein step d) is carried out at a temperature of 20 to 30° C.

28. The method according to claim 1, wherein the suspension of step b) has a temperature of 20 to 25° C., wherein step c) is carried out at a temperature of 20 to 25° C., and wherein step d) is carried out at a temperature of 20 to 25° C.

* * * * *